(12) United States Patent
Sarder et al.

(10) Patent No.: US 10,287,967 B2
(45) Date of Patent: May 14, 2019

(54) INTEGRATED OIL COOLER FOR INTERNAL COMBUSTION ENGINE

(71) Applicant: Champion Engine Technology, LLC, Sussex, WI (US)

(72) Inventors: Mark J. Sarder, Waukesha, WI (US); James J. Dehn, Brookfield, WI (US); Hiroaki Sato, Brookfield, WI (US)

(73) Assignee: Champion Power Equipment, Inc., Santa Fe Springs, CA (US)

( * ) Notice: Subject to any disclaimer, the term of this patent is extended or adjusted under 35 U.S.C. 154(b) by 848 days.

(21) Appl. No.: 14/265,805

(22) Filed: Apr. 30, 2014

(65) Prior Publication Data
US 2015/0315940 A1 Nov. 5, 2015

(51) Int. Cl.
| | | |
|---|---|---|
| *F01P 11/08* | (2006.01) | |
| *F01P 1/06* | (2006.01) | |
| *F01M 5/00* | (2006.01) | |
| *F01P 5/06* | (2006.01) | |
| *B23P 15/26* | (2006.01) | |

(52) U.S. Cl.
CPC .............. *F01P 11/08* (2013.01); *B23P 15/26* (2013.01); *F01M 5/002* (2013.01); *F01P 1/06* (2013.01); *F01P 5/06* (2013.01); *Y10T 29/49234* (2015.01)

(58) Field of Classification Search
CPC .. F01M 5/002; F01M 2005/004; F01M 5/005; F01P 11/08; F01P 11/10; F01P 2060/04; F01P 1/06
See application file for complete search history.

(56) References Cited

U.S. PATENT DOCUMENTS

| | | | |
|---|---|---|---|
| 4,426,965 A | 1/1984 | Patel | |
| 4,928,651 A | 5/1990 | Kronich | |
| 5,477,817 A * | 12/1995 | Hufendiek | ............. F01M 5/002 |
| | | | 123/195 C |
| 5,647,306 A | 7/1997 | Pateman | |
| 7,021,267 B2 | 4/2006 | Kawakubo et al. | |
| 8,573,931 B2 | 11/2013 | Blass et al. | |
| 2010/0283278 A1 * | 11/2010 | Mamada | ................ B60K 11/04 |
| | | | 296/24.41 |

FOREIGN PATENT DOCUMENTS

JP          3954963 B2      7/2004

* cited by examiner

*Primary Examiner* — Jacob Amick
(74) *Attorney, Agent, or Firm* — Ziolkowski Patent Solutions Group, SC

(57) ABSTRACT

An engine assembly including an internal combustion engine, an oil cooler connected to the engine to receive heated oil and discharge cooled oil, and an engine cover mounted to the internal combustion engine and having an opening to receive the oil cooler therein.

23 Claims, 6 Drawing Sheets

INTEGRATED OIL COOLER FOR INTERNAL COMBUSTION ENGINE

BACKGROUND OF THE INVENTION

Embodiments of the invention relate generally to oil coolers for use in internal combustion engines and, more particularly, to an integrated oil cooler that is engaged with an engine or fan cover of the engine to protect the oil cooler while not blocking air flow of the cooling fan to the engine.

General purpose internal combustion engines used as prime movers in power generators, lawn mowers, power washers and various other applications are often air cooled by an engine cooling fan and use an oil cooler placed within the air flow path of the cooling fan to supply cooled oil to the engine and maintain engine efficiency. The oil cooler is typically attached to a surface of the internal combustion engine facing the airflow and has conduits running from the oil cooler to the engine so as to route oil from the engine, to the oil cooler, and back to the engine.

The oil cooler is mounted to the surface of the internal combustion engine so as to be in the air flow path of the cooling fan, allowing the oil to be air cooled while being routed to and from the internal combustion engine. However, in this situation, air flow to the internal combustion engine is being blocked by the oil cooler. Therefore, areas of the internal combustion engine that would otherwise be in the air flow path are not able to be directly cooled by the air flow of the cooling fan, resulting in the engine having a higher operating temperature, and the oil having a higher temperature when leaving the engine and first arriving at the oil cooler. At higher temperatures, oil breaks down at a more rapid rate, which may result in excessive engine wear and premature engine failure due to lack of lubrication. Engine thermal efficiency is also reduced which results in lower power output.

In addition, the conduits running from the oil cooler to the internal combustion engine are subject to accidental damage during use of the internal combustion engine. Specifically, when the oil cooler is mounted to the internal combustion engine, the conduits are not kept away from objects that may cause accidental damage during operation.

Therefore, it would be desirable to provide an integrated oil cooler that is not mounted on the engine, but on, for example, a fan cover of an internal combustion engine system, so as to not block air flow to the engine. It would further be desirable for the integrated oil cooler to be mounted within the fan cover, so as protect the conduits from accidental damage during operation of the internal combustion engine.

BRIEF DESCRIPTION OF THE INVENTION

In accordance with one aspect of the invention, an engine assembly includes an internal combustion engine, an oil cooler connected to the engine to receive heated oil and discharge cooled oil, and an engine cover mounted to the internal combustion engine and having an opening to receive the oil cooler therein.

In accordance with another aspect of the invention, a method of securing an oil cooler in an internal combustion engine assembly includes providing an internal combustion engine, positioning a cooling fan configured to provide cooling during operation of the internal combustion engine, securing an engine cover over the cooling fan, providing an oil cooler configured to cool oil used by the internal combustion engine, and affixing the oil cooler to the engine cover at a location remote from the engine and within a path of airflow from the cooling fan.

In accordance with yet another aspect of the invention, a motor driven apparatus includes a frame assembly, an internal combustion engine mounted to the frame assembly, a cooling fan mounted to one of the frame assembly and the internal combustion engine to cool the internal combustion engine, an engine cover positioned about the cooling fan, the engine cover having an orifice therein, and an oil cooler connected to an oiling system of the internal combustion engine and mounted in the orifice of the engine cover.

These and other advantages and features will be more readily understood from the following detailed description of preferred embodiments of the invention that is provided in connection with the accompanying drawings.

BRIEF DESCRIPTION OF THE DRAWINGS

The drawings illustrate embodiments presently contemplated for carrying out the invention.

In the drawings.

DETAILED DESCRIPTION

Embodiments of the invention are directed to an integrated oil cooler mounted remotely from the engine, and preferably, to an engine cover or fan cover of an internal combustion engine system. It is recognized that the integrated oil cooler may be incorporated into an internal combustion engine system used as a prime mover in any of a number of various applications, including but not limited to engine systems in lawn mowers, power generators, and power washers, for example. While an embodiment of the invention is described below as being incorporated into a lawn mower, and within an engine or fan cover, it is to be understood that such disclosure is not meant to be limiting, and that the scope of the invention is meant to encompass any suitable application in which a general purpose internal combustion engine system can benefit from such construction and positioning of an integrated oil cooler.

Figure 1:
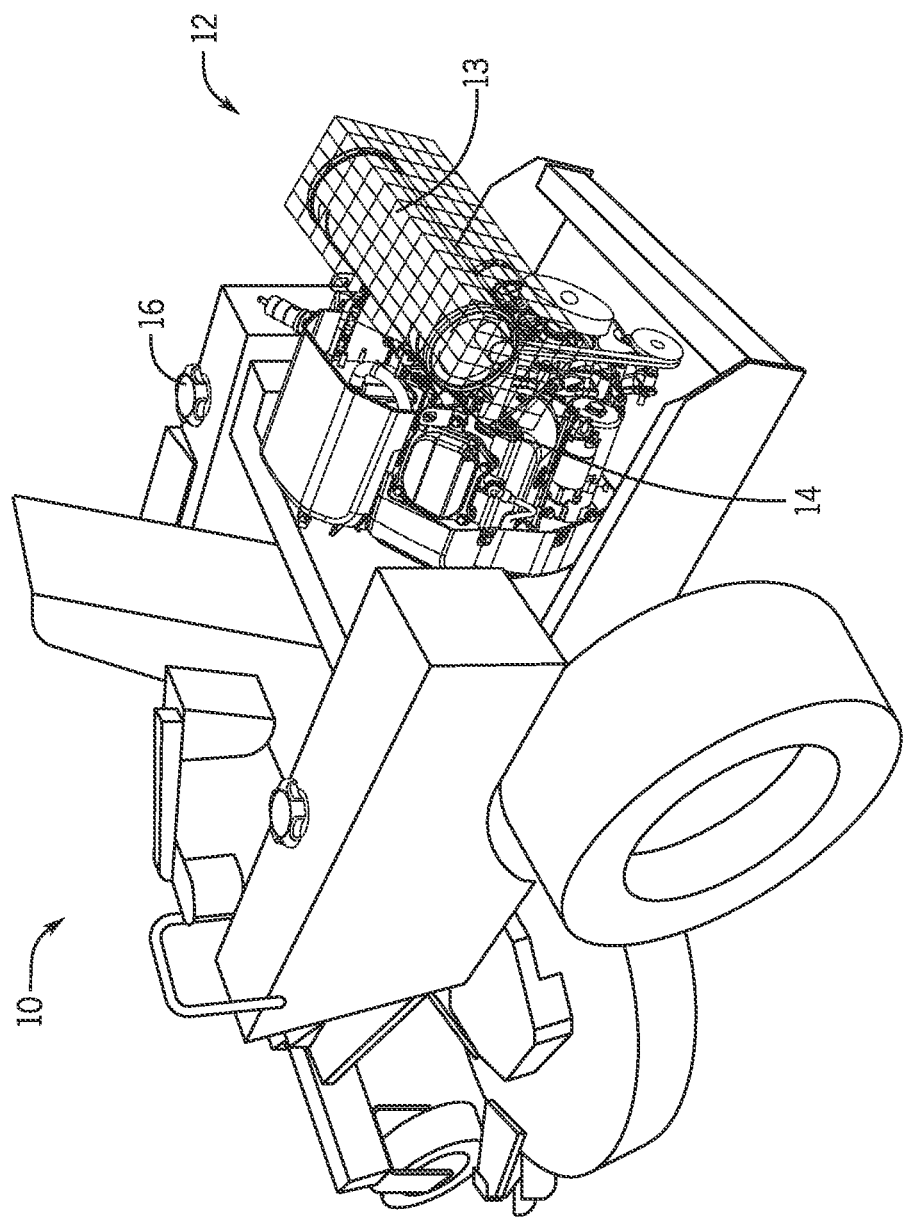
FIG. 1 is a perspective view of a lawn mower suitable for use with an embodiment of the invention.

Referring first to FIG. 1, a lawn mower 10 is shown as one example of a motor driven apparatus that can benefit from incorporation of embodiments of the invention. The invention is not limited to lawn mower use as any motor driven apparatus can benefit from the presently claimed invention, including, but not limited to, a generator, power washer, or any other similar or suitable apparatus/device/system. In general, lawn mower 10 includes an engine assembly 12 having an internal combustion engine 14 and ancillary components, such as muffler 13. While engine assembly 12 is shown at the rear of lawn mower 10, it may be located at the front or midway of the lawn mower. A fuel source 16 is connected to engine 14 for supplying fuel thereto, with the fuel used by engine 14 being any of a number of suitable fuels, including gasoline, for example, or the engine may be equipped to operate on multiple fuels. In operation, a fuel and air mixture is provided to engine 14 and is ignited so as to cause the engine to generate mechanical power that is transferred to other components—such as a cooling fan, a cutting blade, a propulsion system, etc.—through a crankshaft.

Figure 2:
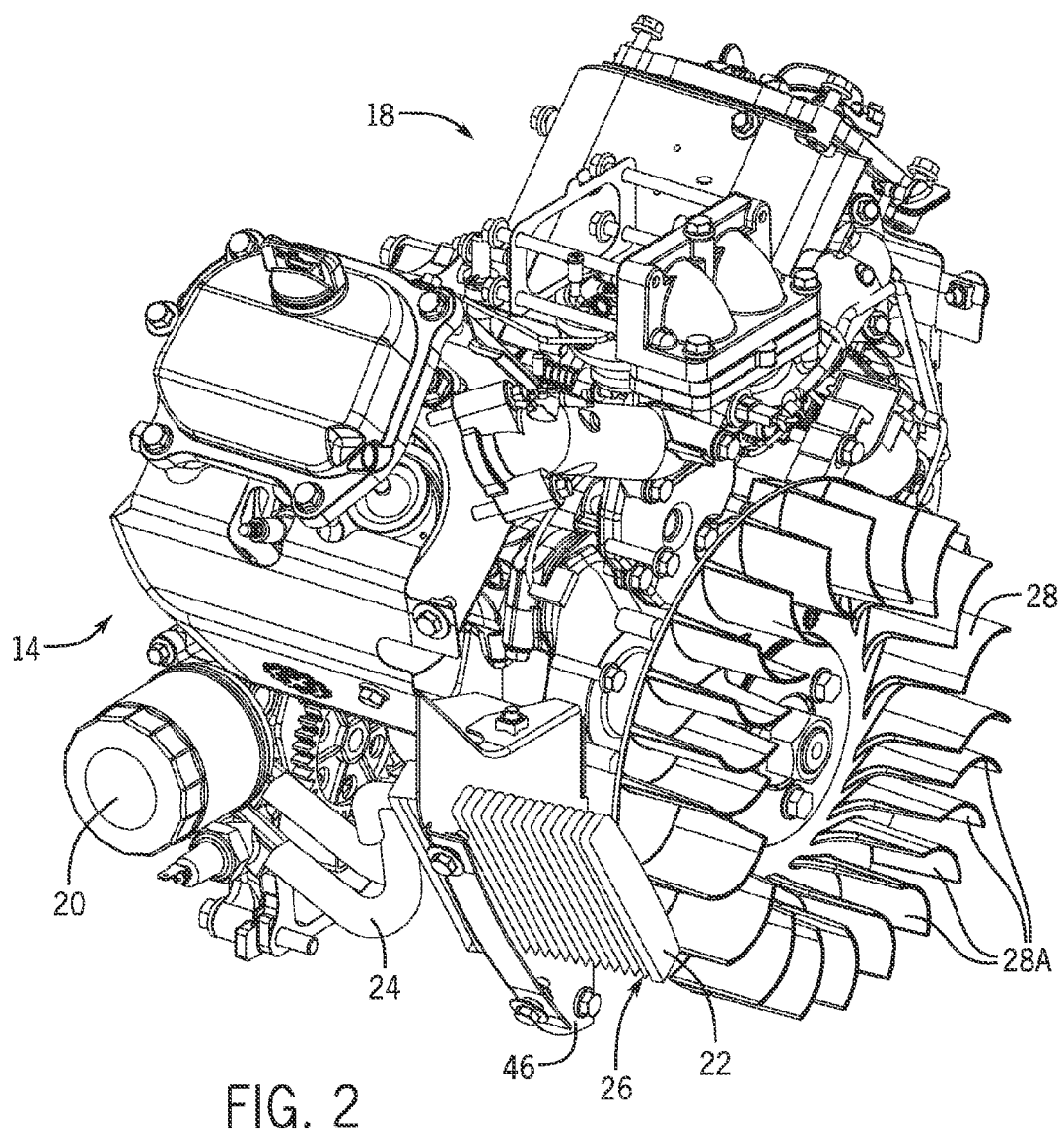
FIG. 2 is a perspective view of an internal combustion engine assembly of FIG. 1 without engine covers.
Figure 3:
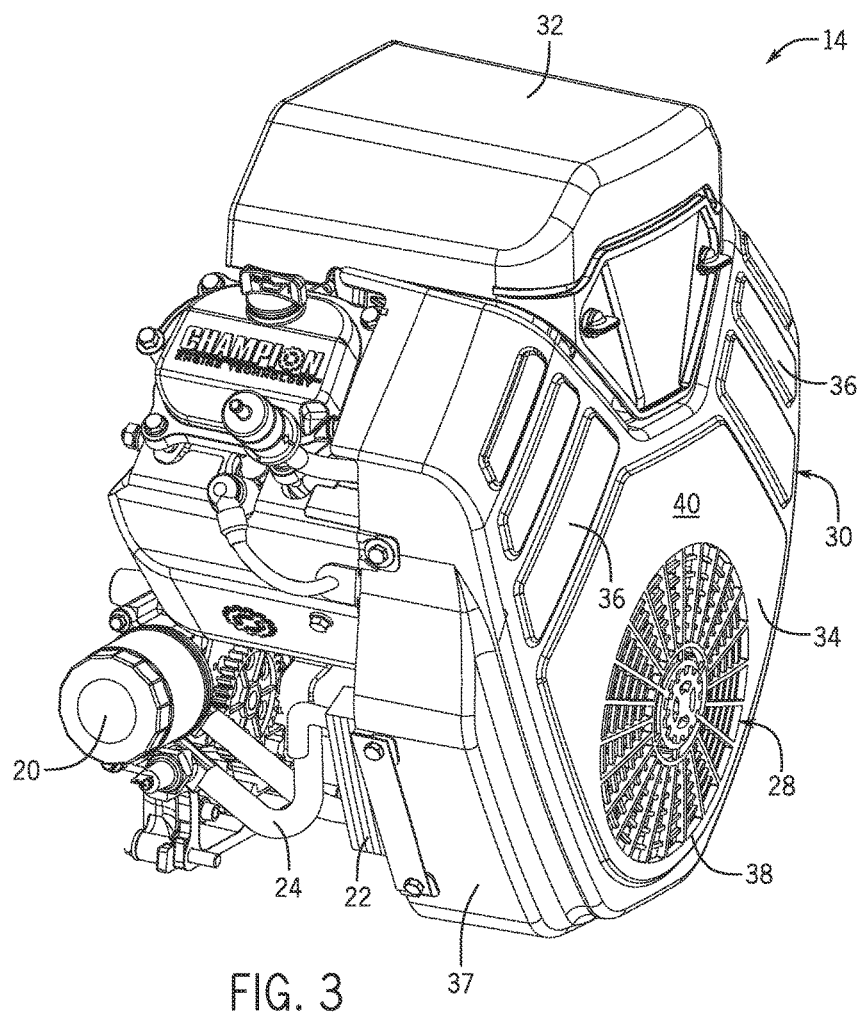
FIG. 3 is a perspective view of an internal combustion engine assembly of FIG. 1 with engine covers.

FIGS. 2 and 3 show a more detailed view of internal combustion engine 14 without any of the ancillary components of engine assembly 12. FIG. 2 shows the engine 14 without covers while FIG. 3 shows the engine 14 having covers installed thereon. As is well known, engine 14 includes a plurality of pistons (not shown) that are slideably received within corresponding cylinders of an engine block, with each cylinder having a cylinder head that includes an intake valve or port for admitting a fuel-air mixture and an exhaust valve or port for venting exhaust gases following combustion, that is collectively indicated as 18.

In order to lubricate internal combustion engine 14, oil is drawn from an oil reservoir (not shown) by an oil pump (not shown), and is supplied to individual portions of engine 14, after passing through an oil filter 20 and an oil cooler 22. Conduits 24 transport the oil between engine 14, oil filter 20, and oil cooler 22. Oil not only lubricates the engine, but also cools the engine as well. The oil cooler 22 is a heat exchanger that cools the heated oil by transferring the heat from the oil to the cooling air as the oil returns to the oil reservoir of engine 14.

In one embodiment of the invention, oil cooler 22 is constructed to include a plurality of cooling fins 26. Each of the cooling fins 26 assist with convective heat transfer between the heated oil to the cooling air of the surrounding environment. As a result, generally, the number and size of the cooling fins 26 included in oil cooler 22, dictate the amount of heat transferred between the heated oil and the surrounding environment.

A cooling fan 28 having a plurality of fins 28A is mounted to engine 14 and driven thereby to provide air to both cool the engine 14 and the oil cooler 22. Cooling fan 28 operates to draw air inside a cover (as shown in FIG. 3) and exhaust the air across engine 14 and oil cooler 22 during operation thereof.

Figure 4:
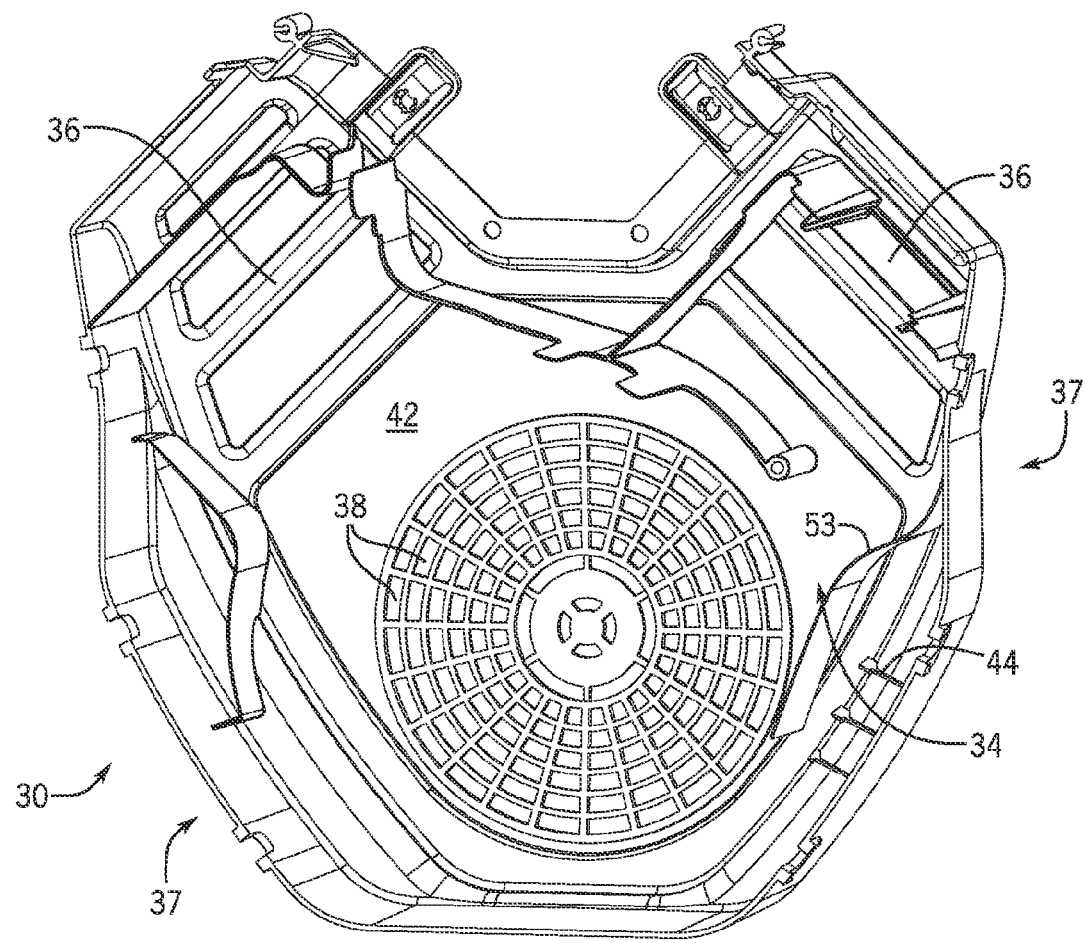
FIG. 4 is an inside view of a fan cover included in the internal combustion engine assembly of FIG. 3 according to an embodiment of the invention.

Referring now to FIG. 3, cooling fan 28 is enclosed by a fan cover or shroud 30, with additional covers generally indicated as 32, also being provided to cover other components of the internal combustion engine 14. While cover 30 is referred to herein as a fan cover, it is generally an engine cover and could be utilized without a fan if there is sufficient air flow from movement of the motor driven apparatus or other sources. Fan cover 30 is uniquely shaped to not only form about the profile of engine 14 but also to provide an aesthetically pleasing appearance. Referring to FIGS. 3 and 4, as shown, cover 30 has a generally V-shaped profile or configuration and includes a planar center region 34, upper inwardly sloped regions 36 that extend outwardly from center region 34, and sides 37 that are generally perpendicular to the planar center region 34. Center region 34 of fan cover 30 is positioned near cooling fan 28 of engine 14 and includes an arrangement of air intake holes 38 formed therethrough to allow a flow of cooling air drawn toward engine 14 and oil cooler 22 during operation.

While FIG. 3 shows an outwardly facing surface 40 of fan cover 30, FIG. 4 shows an inwardly facing surface 42. The cover has both functional and aesthetic characteristics. For example, the inwardly facing surface 42 is constructed to enable positioning of fan cover 30 over cooling fan 28 and the other components of engine 14. Additionally, inwardly facing surface 42 of fan cover 30 is constructed so as to enable mounting of integrated oil cooler 22 thereto as will be described below. Inner surface 42 includes support ribs 44 formed into inner surface 42 that enable mounting of integrated oil cooler 22 to fan cover 30. Support ribs 44 are formed in fan cover 30 such that integrated oil cooler 22 does not interfere with positioning fan cover 30 over cooling fan 28. Support ribs 44 are also formed in the fan cover 30 in a location such that integrated oil cooler 22 is air-cooled by cooling fan 28, but does not interfere with cooling air flow toward engine 14 as generated by cooling fan 28 of FIG. 2.

Referring again to FIG. 4, and according to an exemplary embodiment of the invention, support ribs 44 are formed on inner surface 42 of fan cover 30 and configured to receive and interfit with integrated oil cooler 22. That is, in this embodiment, the fins of the oil cooler 22 can interfit with the support ribs 44 to aid in securing the oil cooler 22 in the fan cover 30. As fan cover 30 is fabricated of a material such as resin or other polymer that may be manufactured via an injection molding process, for example, support ribs 44 may be integrally formed into inner surface 42 of fan cover 30 rather than being a separately formed or attached component. Alternatively, such supports could be formed as part of the oil cooler. While support ribs 44 are described as ribs in the cover, it is recognized that support ribs 44 may have a different construction that would enable a sliding or snapping engagement of integrated oil cooler 22 to fan cover 30. In addition, it is contemplated that support ribs 44 may contain more or less than three (3) ribs.

Figure 5:
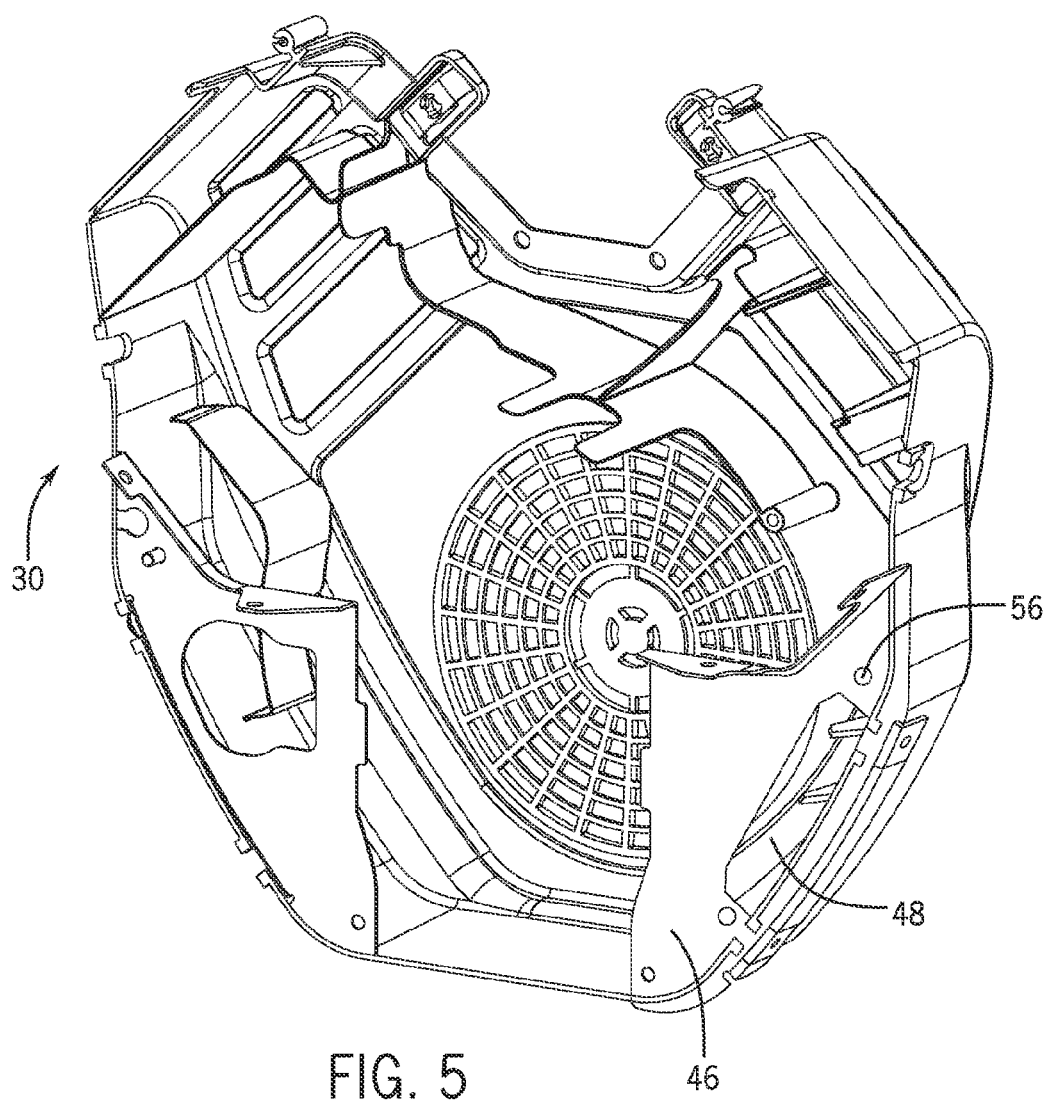
FIG. 5 is a perspective view of the fan cover of FIG. 4 with an air board mounted thereon according to an embodiment of the invention.

FIG. 5 shows the fan cover 30 removed from the engine with air board 46 coupled to fan cover 30 via a plurality of fasteners. One having ordinary skill in the art would recognize that air board 46 and fan cover 30 can be coupled in a variety of other ways, such as tab/slot mating. In addition, air board 46 may be integrally manufactured with fan cover 30, resulting in air board 36 being a back side of fan cover 30. Air board 46 assists with directing the air drawn in by cooling fan 28 to the cylinders of engine 14 in order to more efficiently cool engine 14, while also protecting cooling fan 28 from debris. According to one embodiment, air board 46 is secured to fan cover 30 at a location adjacent or proximate to support ribs 44 and includes an orifice 48 formed therein that is configured to receive oil cooler 22.

Figure 6:
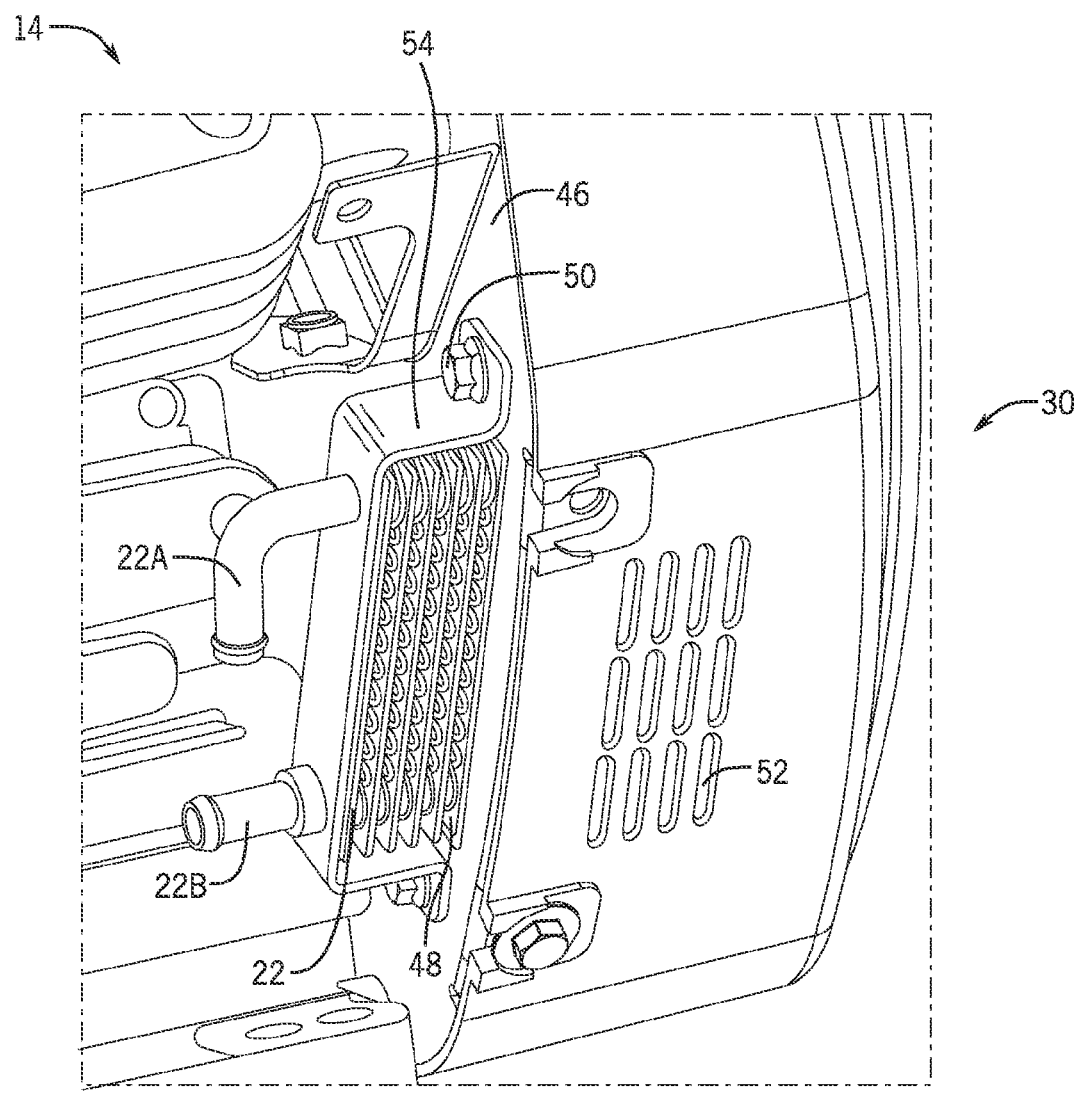
FIG. 6 is a perspective view of a portion of the internal combustion engine assembly of FIG. 3 according to an embodiment of the invention.

FIG. 6 is a detailed view of the oil cooler 22 mounted to the cover 30 assembled onto engine 14. Oil cooler 22 has an oil intake port 22A and an oil discharge port 22B. As shown in FIG. 6, oil cooler 22 extends through orifice 48 of cover 30 and is coupled to the air board 46 of cover 30 via at least one fastener 50. In a preferred embodiment, one or more fasteners 50 are used to secure the oil cooler 22 to the cover 30 through a mounting bracket 54 having fastener holes 56. Air board 46 not only assists with air flow, but also provides protection of oil cooler 22 from debris encountered during operation of the lawn mower or other motor driven apparatus. In one embodiment of the invention, fan cover 30 includes at least one vent 52 located adjacent to oil cooler 22. Vent 52 provides additional air flow to assist with ventilating air across oil cooler 22. As a result, the temperature of the air projected to engine 14 would not be affected by the warmer air that has already passed over oil cooler 22.

In another embodiment of the invention, an air deflector 53 (shown in FIG. 4) is coupled to inner surface 42 of fan cover 30 to create a plurality of air paths. Alternatively, air deflector 53 could be formed on inner surface 42 of fan cover 30. A first air path allows fresh air to bypass oil cooler 22 and pass directly to engine 14 for cooling. Meanwhile, a second air path directs air through oil cooler 22 and out vents 52.

Beneficially, embodiments of the invention thus provide an integrated oil cooler for use in a general purpose internal combustion engine, such as might be found in a lawn mower, electrical generator, power washer, or any other motor driven apparatus. The integrated oil cooler is mounted to the fan cover of the engine, as opposed to being mounted directly to the internal combustion engine, such that the integrated oil cooler may be positioned so as to not block the flow of cooling air to the internal combustion engine. In addition, the fan cover and air board protect the oil cooler and conduits from accidental damage during operation of the engine and the motor driven apparatus.

Therefore, according to one embodiment of the invention, an engine assembly includes an internal combustion engine, an oil cooler connected to the engine to receive heated oil and discharge cooled oil, and an engine cover mounted to the internal combustion engine and having an opening to receive the oil cooler therein.

According to another embodiment of the invention, a method of securing an oil cooler in an internal combustion engine assembly includes providing an internal combustion engine, positioning a cooling fan configured to provide cooling during operation of the internal combustion engine, securing an engine cover over the cooling fan, providing an oil cooler configured to cool oil used by the internal combustion engine, and affixing the oil cooler to the engine cover at a location remote from the engine and within a path of airflow from the cooling fan.

According to yet another embodiment of the invention, a motor driven apparatus includes a frame assembly, an internal combustion engine mounted to the frame assembly, a cooling fan mounted to one of the frame assembly and the internal combustion engine to cool the internal combustion engine, an engine cover positioned about the cooling fan, the engine cover having an orifice therein, and an oil cooler connected to an oiling system of the internal combustion engine and mounted in the orifice of the engine cover.

While the invention has been described in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An engine assembly comprising:
   an internal combustion engine;
   an oil cooler connected to the engine to receive heated oil and discharge cooled oil; and
   an engine cover mounted to the internal combustion engine and having an opening to receive the oil cooler therein.

2. The engine assembly of claim 1 further comprising a cooling fan mounted to the internal combustion engine wherein the engine cover substantially encloses the cooling fan.

3. The engine assembly of claim 1 wherein the engine cover includes an air board with the opening formed therein configured to receive the oil cooler and direct air flow.

4. The engine assembly of claim 2 wherein the oil cooler is secured to the engine cover in a position such that air blown by the cooling fan thermally interacts with the oil cooler.

5. The engine assembly of claim 1 wherein the engine cover includes at least one vent adjacent to the oil cooler.

6. The engine assembly of claim 5 wherein the engine cover further includes an air deflector adjacent to the oil cooler.

7. The engine assembly of claim 1 wherein the engine cover has an outer surface and an inner surface, the inner surface having at least one support rib arranged to mate with the oil cooler and secure the oil cooler to the engine cover.

8. The engine assembly of claim 7 wherein the oil cooler comprises a plurality of fins extending therefrom to provide convective cooling and wherein the at least one support rib formed on the inner surface of the engine cover is configured to interfit with at least one of the plurality of fins of the oil cooler.

9. The engine assembly of claim 7 wherein the engine cover further comprises:
   a center region positioned adjacent the cooling fan and including an arrangement of air intake holes formed therein through which a flow of cooling air is drawn in by the cooling fan to cool the internal combustion engine; and
   an outer region extending outwardly from the center region;
   wherein the at least one support rib is formed in the outer region of the engine cover, on the inner surface thereof, such that mating of the oil cooler to the at least one support rib does not interfere with positioning of the engine cover over the cooling fan.

10. The engine assembly of claim 9 wherein mating of the oil cooler to the outer region of the engine cover provides for air-cooling of the oil cooler by air blown by the cooling fan, while still enabling the air flow generated by the cooling fan to reach the combustion engine.

11. A method of securing an oil cooler in an internal combustion engine assembly, the method comprising:
    providing an internal combustion engine;
    positioning a cooling fan configured to provide cooling during operation of the internal combustion engine;
    securing an engine cover over the cooling fan;
    providing an oil cooler configured to cool oil used by the internal combustion engine; and
    affixing the oil cooler to the engine cover at a location remote from the engine and within a path of airflow from the cooling fan.

12. The method of claim 11 further comprising:
    forming at least one support rib within the engine cover;
    providing an orifice in a back side of the engine cover configured to receive the oil cooler; and
    coupling the oil cooler to the engine cover through the orifice such that the oil cooler is supported by the at least one support rib within the engine cover.

13. The method of claim 12 further comprising attaching an air board to the back side of the engine cover wherein the orifice to receive the oil cooler therein is within the air board.

14. The method of claim 11 further comprising forming at least one vent in a side of the engine cover adjacent to the oil cooler, the at least one vent providing ventilation for air flow that is passed across the oil cooler.

15. The method of claim 14 further comprising attaching an air deflector to the inner portion of the engine cover adjacent to the oil cooler, the air deflector directing one portion of an air flow across the engine and another portion of the air flow across the oil cooler.

16. The method of claim 11 further comprising fluidly connecting the oil cooler to the internal combustion engine via a plurality of conduits configured to circulate oil between the internal combustion engine and the oil cooler.

17. A motor driven apparatus comprising:
a frame assembly;
an internal combustion engine mounted to the frame assembly;
a cooling fan mounted to one of the frame assembly and the internal combustion engine to cool the internal combustion engine;
an engine cover positioned about the cooling fan, the engine cover having an orifice therein; and
an oil cooler connected to an oiling system of the internal combustion engine and mounted in the orifice of the engine cover.

18. The motor driven apparatus of claim 17 further comprising an air board coupled to the engine cover, wherein the orifice of the engine cover is within the air board, the air board positioned to direct airflow to cool the internal combustion engine.

19. The motor driven apparatus of claim 18 wherein the air board provides for air-cooling of the oil cooler by air flow generated by the cooling fan, while still providing air flow generated by the cooling fan to cool the internal combustion engine.

20. The motor driven apparatus of claim 17 wherein the engine cover has at least one support rib within the engine cover to support at least a portion of the oil cooler.

21. The motor driven apparatus of claim 17 wherein the engine cover includes at least one vent formed adjacent the oil cooler, the at least one vent providing ventilation for air flow across the oil cooler.

22. The motor drive apparatus of claim 21 wherein the engine cover further includes an air deflector formed adjacent the oil cooler.

23. The motor driven apparatus of claim 17 further comprising a plurality of conduits configured to circulate oil between the internal combustion engine and the oil cooler positioned in the engine cover.

* * * * *